United States Patent

Munger et al.

[15] 3,688,562
[45] Sept. 5, 1972

[54] ULTRASONIC INSPECTION APPARATUS

[72] Inventors: Donald W. Munger, New Milford; Frederick G. Weighart, Brookfield, both of Conn.

[73] Assignee: Automation Industries, Inc., El Segundo, Calif.

[22] Filed: Dec. 8, 1967

[21] Appl. No.: 689,057

[52] U.S. Cl. ............... 73/67.7, 73/71.5, 340/12 SD
[51] Int. Cl. ............................................. G01n 29/04
[58] Field of Search ......................... 73/67.5–67.9; 340/12 R

[56] References Cited

UNITED STATES PATENTS

| | | |
|---|---|---|
| 3,282,086 | 10/1966 | McCorkindale et al. ....73/67.8 |
| 2,946,217 | 7/1960 | Fruengel.....................73/67.5 |
| 3,007,133 | 10/1961 | Padberg, Jr..................340/12 |
| 3,229,508 | 1/1966 | Sharpe et al................73/67.5 |
| 3,230,506 | 1/1966 | Hellund.......................340/12 |
| 3,245,032 | 4/1966 | Knott et al...................340/12 |

OTHER PUBLICATIONS

Moon, Warren; An Investigation of the Underwater Spark, Thesis received Massachusetts Institute of Technology Library, June 17, 1958; pp. i, 3, 4, 5 and 6.

*Primary Examiner*—Richard C. Queisser
*Assistant Examiner*—John P. Beauchamp
*Attorney*—Dan R. Sadler

[57] ABSTRACT

An ultrasonic nondestructive testing system is disclosed for inspecting materials for internal discontinuities. The system includes a transducer for generating ultrasonic energy and radiating such energy toward the workpiece. The transducer includes one or more electrodes which are disposed in an electrolyte. A pulse generator circulates a very short duration pulse of electricity between the electrodes and through the electrolyte whereby a pulse of ultrasonic energy is transmitted. By controlling the amplitude, duration and other characteristics of the current it is possible to control the characteristics of the radiated ultrasonic energy.

4 Claims, 5 Drawing Figures

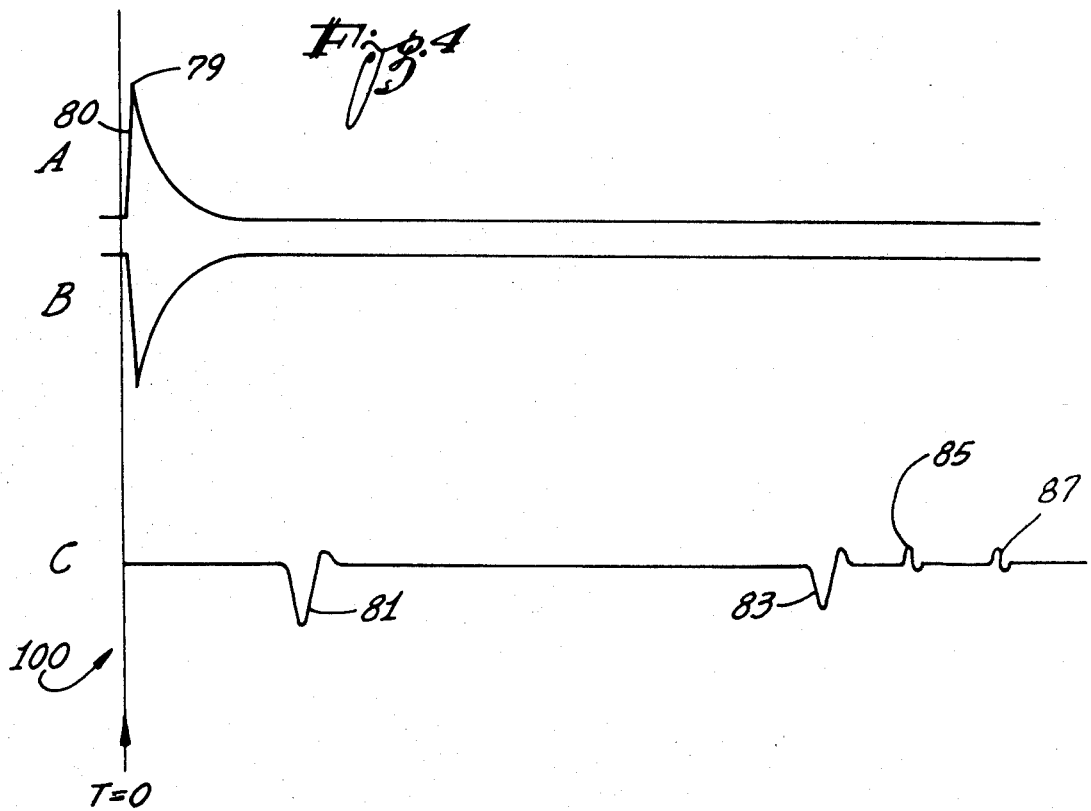
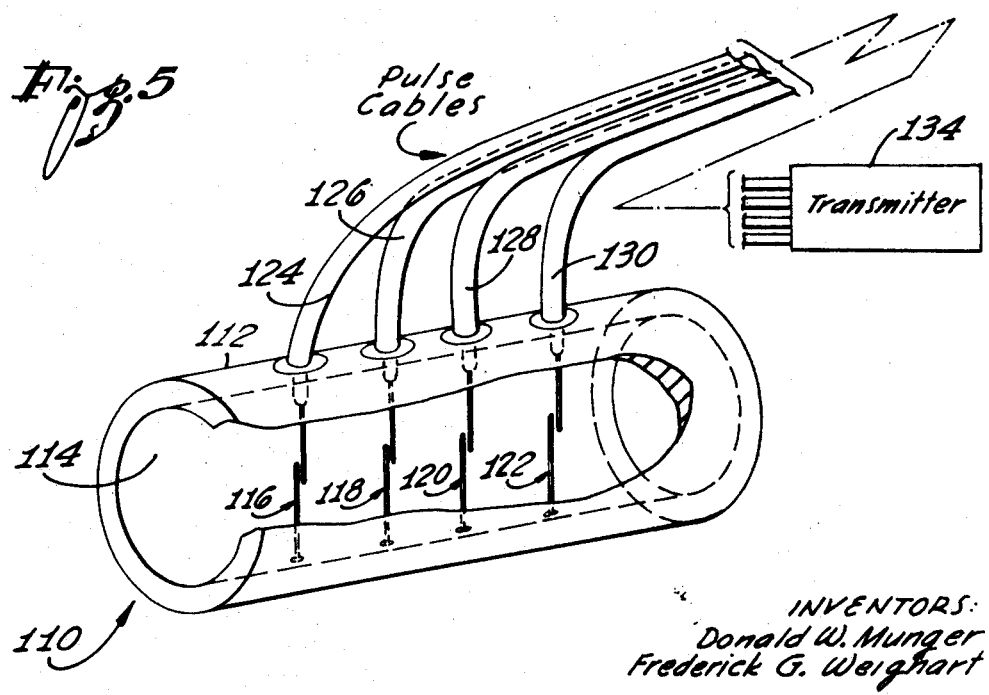

ULTRASONIC INSPECTION APPARATUS

BACKGROUND OF THE INVENTION

One common type of nondestructive testing equipment transmits ultrasonic energy into the workpiece and observes the interreaction between the energy and the workpiece. The expression ultrasonic energy as used herein refers to physical vibratory wave motion of the type present in audible sound. However, the frequency of the vibrations are usually considerably above the normal range of hearing and may extend from about 20 kilocycles up to 50 megacycles or higher. Energy of this nature tends to be highly attenuated by air, particularly at the high frequencies. However, it normally propagates readily through most solids and liquids with little attenuation. In the event there is an acoustical discontinuity in the material (for example a crack, inclusion, etc.) at least a portion of the energy is absorbed and/or reflected. In ultrasonic nondestructive testing the energy is transmitted into a workpiece and the manner in which it is absorbed and/or reflected is measured. From this information it is possible to locate and identify discontinuities that are otherwise hidden within the workpiece.

Historically ultrasonic energy has been generated by means of an electro-accustic transducer employing a device such as a piezoelectric crystal. When a voltage is applied to such a crystal it is physically distorted out of shape. If the voltage has a frequency in the ultrasonic range the crystal moves and radiates energy which is in the ultrasonic range. Such crystals are well suited for generating ultrasonic energy, particularly for nondestructive testing systems. However, they have several serious limitations.

The transducers are difficult to make (particularly to very close tolerances) and as a result they are very expensive. Moreover, the crystals have only a limited ability to radiate large amounts of power. Since the crystals vibrate mechanically, once they have been set in motion they tend to "ring" for a considerable period of time following initial excitation. As a consequence it is virtually impossible to radiate a pulse of energy containing a single cycle or less.

The frequency at which a crystal operates is a function of its physical dimensions. When a crystal is intended to operate in a high frequency range (for example 15 to 30 megacycles) the crystal becomes very small and all of the foregoing problems are increased. The use of the higher frequencies is desirable since the ability to focus the energy into a well defined beam, the ability to detect smaller discontinuities and the ability to resolve the characteristics of the discontinuities, etc. improve as the frequency increases.

More recently it has been proposed to generate ultrasonic energy without employing a physically vibrating member, such as a crystal. An ultrasonic test system of this nature is disclosed and claimed in copending application, Ser. No. 517,279, now abandoned, entitled Material Tester, filed Dec. 29, 1965, in the name of Donald Munger and assigned of record to Automation Industries, Inc. In such a system a pair of discharge electrodes are immersed in a discharge fluid and separated from each other by a discharge gap. A pulse generator is coupled to the electrodes for intermittently imposing a very high voltage pulse across the two electrodes. This voltage is large enough to break down the discharge fluid whereby an electrical discharge arc occurs between the two electrodes. The arc discharge causes a large amount of ultrasonic energy to be radiated through the discharge fluid. By making the voltage pulse of extremely short duration and with a very rapid rate of increase it has been found possible to produce an ultrasonic pulse which is very short, for example a single cycle or less. As a consequence, such a system is particularly well adapted for testing materials which are highly attenuative, as well as resolving small targets and/or closely spaced targets.

SUMMARY OF THE INVENTION

The present invention provides means for overcoming the foregoing difficulties. More particularly, the present invention provides a new and novel ultrasonic test system and transducer wherein ultrasonic energy is generated without a piezoelectric crystal or an electrically conductive arc discharge. The system and transducer are not only simple and economical to manufacture but are also reliable and durable. The system and transducers are capable of producing a series of repetitive pulses of ultrasonic energy wherein the pulses are of short duration and of consistent characteristics.

In the limited number of embodiments of the invention disclosed herein an ultrasonic test system is provided wherein a pair of electrically conductive electrodes are separated from each other by a gap filled with an electrically conductive liquid. A current source is coupled to the two electrodes for circulating an electric current between the electrodes and through the liquid. The voltage across the electrodes and the magnitude of the current is maintained below the level required to produce an arc discharge. As the magnitude of the current through the liquid varies and particularly as it increases a stress is created within the liquid which causes ultrasonic energy to be radiated. It has been found that by varying the dimensions of the gap and the rate of change of the current the characteristics of the ultrasonic energy can be varied.

SUMMARY OF DRAWINGS

These and other features and advantages of the present invention will become readily apparent from the following detailed description of a limited number of embodiments thereof, particularly when taken in connection with the accompanying drawings wherein like reference numerals refer to like parts and wherein;

FIG. 4 is a series of waveforms present in different portions of the system, and FIG. 5 is a perspective view of a transducer embodying another form of the present invention.

DETAILED DESCRIPTION OF DRAWINGS

Figure 1:
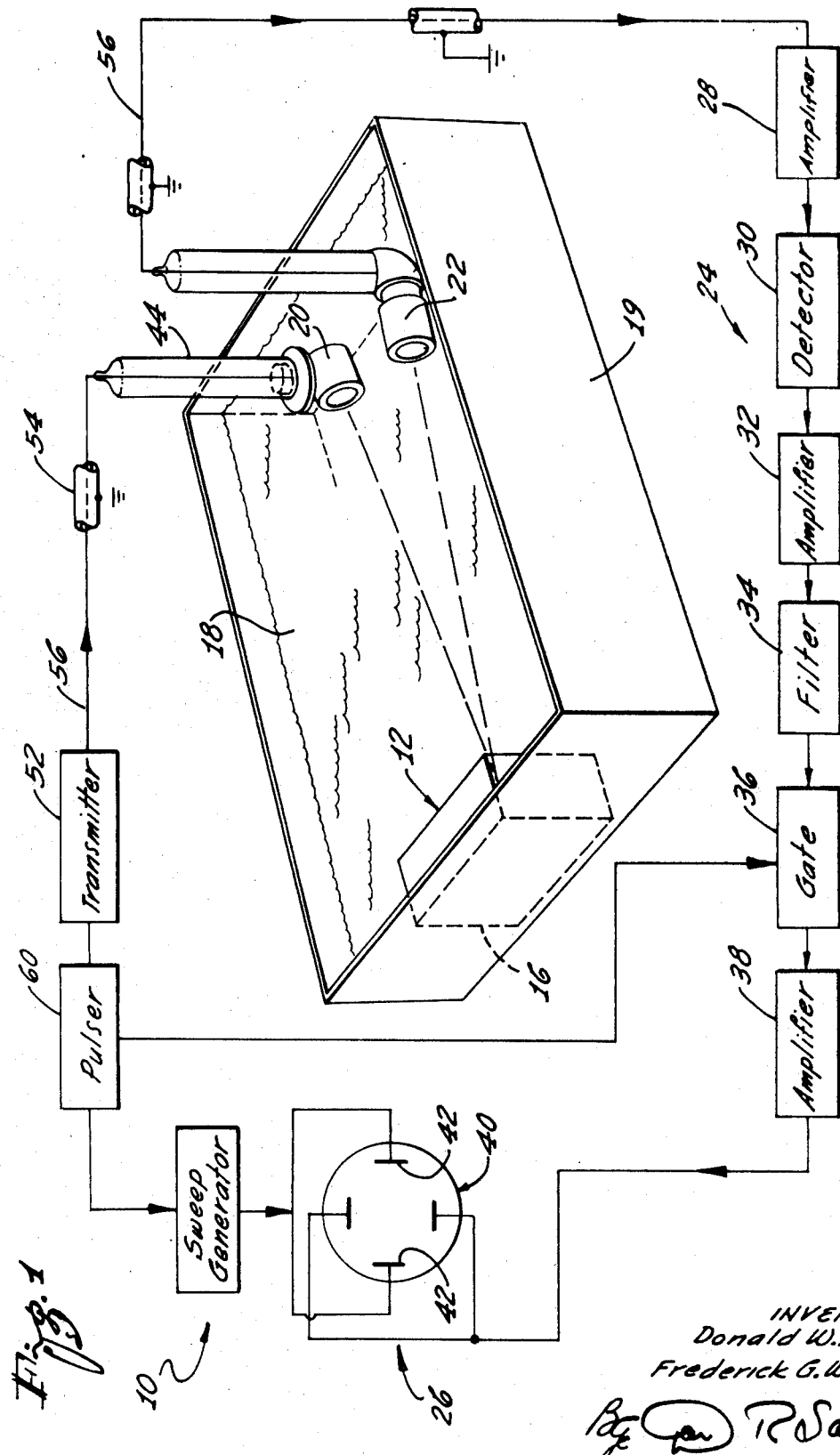
FIG. 1 is a combined perspective view and block diagram of an ultrasonic nondestructive test system embodying one form of the present invention.

Referring to the drawings in more detail and particularly to FIG. 1, the present invention is particularly adapted to be employed in a system 10 for testing and/or inspecting workpieces by means of ultrasonic energy. Although the workpiece 12 may be of any desired configuration, in the present instance it is shown as a block having a substantially plain entrant or front surface 14 through which the ultrasonic energy may enter and a rear or back surface 16 which is spaced from the front surface by the thickness of the workpiece 12.

The workpiece 12 is submerged in a liquid bath 18 contained within a tank 19. The tank 19 is large enough to allow the entire workpiece 12, and at least a portion of the test system 10, to be disposed therein. However, as explained subsequently, it is not necessary for the workpiece 12 to be submerged in a liquid bath.

The primary purposes of the liquid 18 is to acoustically couple the immersed portions of the test system 10 to the workpiece 12. The liquid 18 is, therefore, preferably highly acoustically conductive and has acoustical characteristics closely resembling those of the workpiece 12. This tends to reduce the magnitude of any echoes reflected from the entrant surface 14 and causes a large amount of the acoustical energy to be coupled into the workpiece 12.

A transmitting transducer 20 is submerged in the bath 18 in spaced relation to the workpiece 12. The transducer 20 is effective to radiate ultrasonic energy into and through the liquid 18 whereby it is incident upon the entrant surface 14 of the workpiece 12. Portions of this ultrasonic energy are reflected from the interface between the liquid 18 and the surface 14 and the interface at the back surface 16. These reflections are returned as echoes toward the transducer.

If there is an acoustical discontinuity between the front and back surfaces 14 and 16 (for example a crack, void, inclusion, etc.) a portion of the energy incident on the discontinuity will be reflected and/or absorbed by the discontinuity. By observing the resultant echoes and/or the extent to which the energy is absorbed, the characteristics of the workpiece 12 may be determined.

A receiving transducer 22 may be immersed in the liquid 18 for receiving the ultrasonic energy radiated by the transducer 20 and the returning echoes. It is to be noted that although the present system 10 is arranged to operate in a pulse-echo mode, it may be arranged to operate in a through transmission mode. In this event the receiving transducer 22 is disposed on the side of the workpiece 12 opposite from the transmitting transducer 20 whereby it receives the energy after it has passed completely through the workpiece 12. The receiving transducer may be of any suitable variety capable of producing an electrical signal corresponding to the received echoes. By way of example a piezoelectric crystal may be employed.

The receiving transducer 22 is coupled to a suitable receiver means 24 capable of receiving the electrical signals and producing one or more corresponding received signals. The receiver means 24 is in turn coupled to means 26 capable of indicating the nature of the workpiece 12.

The receiving means 24 may include an R.F. amplifier 28 which is capable of amplifying the signals produced by receiving transducer 22. The amplified signal normally includes a series of high frequency, short duration pulses which may or may not be in the form of an envelope on an R.F. carrier.

A detector 30 is coupled to the R.F. amplifier 28 and is effective to remove the R.F. carrier (if present) and the pulses of one polarity. This will leave a series of unipolar pulses. A suitable amplifier 32 and filter 34 may be coupled to the detector 30. A normally closed gate 36 couples the filter 34 to an amplifier 38. The amplifier 38 amplifies the pulses passed by the gate 36 and couples them to suitable indicating means 26. In the present instance the indicating means includes a cathode ray tube 40 having its vertical deflection plate 42 coupled to the amplifier 38.

Figure 2:
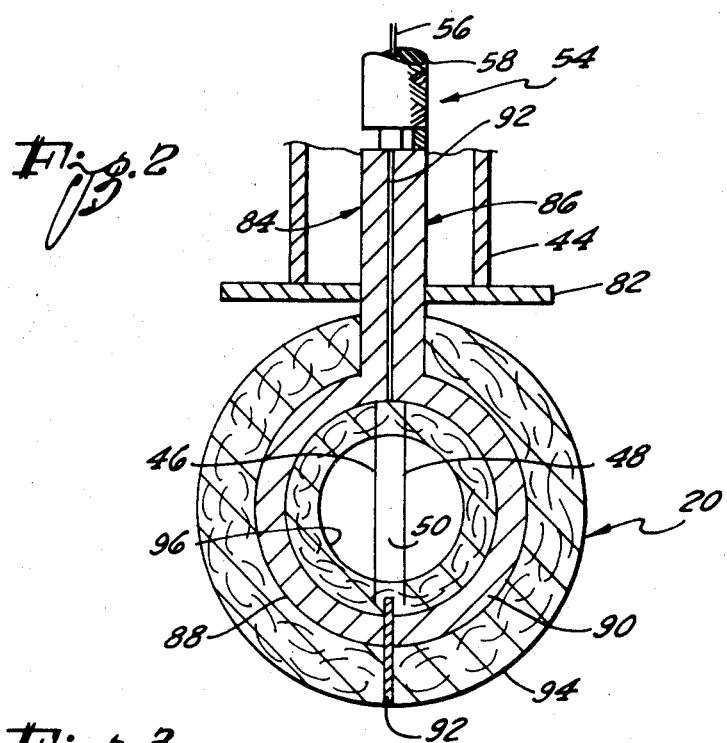
FIG. 2 is a cross sectional view of a transducer embodying one form of the present invention.

The present transmitting transducer 20 (best seen in FIGS. 1 & 2) is attached to the end of a probe 44 adjacent the end wall of the tank 19 whereby the transducer 20 remains in a fixed position at some predetermined depth below the surface of the liquid 18.

The transducer 20 includes a pair of discharge electrodes 46 and 48 that are separated from each other by a discharge gap 50. The two electrodes 46 and 48 are coupled to a pulse generator or transmitter 52 by a coaxial cable 54 having concentric inner and outer conductors 56 and 58. The transmitter 52 supplies driving pulses of current to the transducer 20 whereby the transducer 20 radiates pulses of ultrasonic energy throughout the liquid bath 18.

A separate timer or pulser 60 is coupled to the transmitter 52 whereby a sequence of timing pulses are supplied to the transmitter 52. The frequency of these pulses determine the repetition rate of the entire system 10. Although the repetition rate may be of any desired amount, it has been found a rate in the general range of up to several kilocycles per second or higher is suitable for many applications.

The transmitter 52 should be capable of supplying a current pulse having a high rate of increase and very short duration. For example, the peak 79 may be reached in a fraction of a microsecond and the pulse may be completed in a microsecond or less. The voltage of the pulse or the conductivity of the fluid should normally be maintained below that required to cause the discharge gap 50 to break down and produce an electrically conductive arc across the gap 50. There are a wide variety of current sources, such as a thyratron pulser, suitable for producing such pulses.

Figure 3:
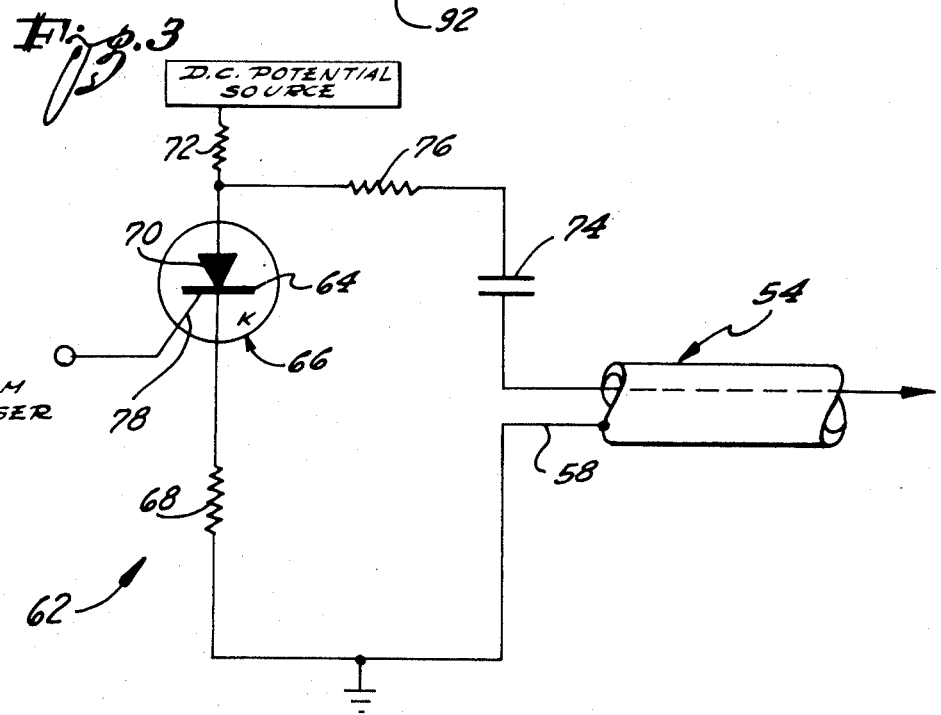
FIG. 3 is a schematic diagram of a pulse generator for energizing the transducer of FIG. 2.

A silicon controlled rectifier circuit 62, similar to that in FIG. 3, has been found particularly well suited for this purpose. The cathode 64 of the silicon control rectifier or SCR 66 is connected to electrical ground. If desired, a current limiting resistor 68 may be provided to limit the maximum amplitude of the current flow and afford protection against a short circuit load. Normally the overall resistance of this connection is very small, for example on the order of 1 or 2 ohms.

The anode 70 is connected to the positive side of a DC power supply by a load resistor 72 having a resistance on the order of 200,000 ohms. The anode 70 is coupled to the center conductor 56 in the coaxial cable 54 by a condenser 74 and load resistor 76. This resistor 76 may be relatively small, for example on the order of 10 ohms while the condenser 74 may be on the order of 10 microfarads. If higher pulse repetition frequency tests are desired, the condenser may be in the range of about 0.01 microfarads.

Control gate 78 is coupled directly to the pulser 60 so as to be triggered by the timing pulses that control the repetition rate of the entire system. Between timing pulses the silicon controlled rectifier 66 is non-conductive and the condensers 74 become fully charged. The resistor 72 should be small enough to permit the condenser 74 becoming substantially fully charged between the timing pulses but large enough to prevent S.C.R. hold.

Each time a timing pulse is applied to the control electrode 78 the rectifier 66 becomes conductive. This forms a very low resistance discharge path which extends along the coaxial cable 54 and includes the electrodes 46 and 48 and the gap 50 therebetween. When the rectifier 66 becomes conductive virtually the entire voltage on the condenser 74 is instantly impressed across the gap 50 whereby a current flow through the liquid 18 between the electrodes 46 and 48 until the energy is dissipated. The liquid 18 should be electrically conductive and the resistance should be low enough to permit a substantial current flow without an excessively large voltage. It has been found ordinary tap water is satisfactory. However, if desired, substances such as detergents, salt, etc. may be added to the liquid to reduce its resistance.

The discharge circuit is critically damped and/or the rectification of the SCR limits the current to a single pulse flowing in a single direction. As a practical matter, under some circumstances, there may be a bidirectional flow as the current dies out over several cycles. However, if a high resolution system is desired the current should be confined to substantially a single pulse of one direction (i.e. one-half cycle). The switching time of the SCR 66 is the primary factor limiting the rate at which the voltage builds up and the current flows between the electrodes 40 and 48.

The manner in which the voltage and current builds up is shown in FIG. 4A and 4B respectively. The voltage rapidly rises, similar to the leading edge 80, until substantially the entire voltage stored across the condenser 74 is present across the gap 50. The energy stored on the condenser 74 is then rapidly dissipated around the discharge path and through the gap 50.

The probe 44 includes a tubular support into which the end of the coaxial cable 54 extends. The lower end of the support may be closed by a shield 82. A pair of brackets 84 and 86 extend beyond the shield 87. Each bracket 84 and 86 includes an offset C-shaped segment 88 and 90. One of the brackets 84 and 86 is connected to the center conductor 56 in the cable 54 while the other bracket 86 is connected to the outer or grounded conductor 58. A layer 92 of insulating material may be disposed between the two brackets 84 and 86 to insure their remaining electrically separated.

Electrodes 46 and 48 are stretched across the open parts of the segments 88 and 90. The electrodes 46 and 48 may be formed from any suitable materials. However, relatively fine copper wires have been found particularly well suited. These two electrodes 46 and 48 are essentially parallel to each other so as to be separated by a relatively narrow open space. This forms a gap 50 which is relatively long but narrow.

An insulating material such as, beeswax, plastic etc., may be cast into a shroud 94 which surrounds the segment 88 and 90 of the brackets 84 and 86 so as to completely encase them and insulate them from external contact. However, the central portion of the shroud 94 is left open to form a passage 96 which extends at least partially through the transducer 20. This passage 96 exposes the electrodes 46 and 48 whereby a large portion of the gap 50 is exposed to the exterior. It can be seen the only portion of the discharge circuit which is exposed to the liquid 18, is this discharge gap 50.

If the transducer 20 is submerged in the coupling liquid 18 the discharge gap 50 between the two electrodes 46 and 48 and the passage 50 are filled with the coupling liquid 18. When the SCR 66 becomes conductive the stored charge on the condenser 74 travels over the coaxial cable 54 and from one electrode through the liquid 18 to the opposite electrode. During the flow of this current ultrasonic energy is created. This energy is radiated from the passage 96 and throughout the liquid 18.

The ultrasonic energy will normally closely resemble the current waveform shown in FIG. 4C. The exact mechanism by which this ultrasonic energy is produced is not fully understood at this time. It may be an electrostatic or other force causes a physical displacement of the electrodes 46 and 48. It is possible a physical displacement of the liquid 18 occurs in the region of the current flow as a result of sudden and very localized thermal expansion. It may be the current causes a very high localized stress in the liquid 18 which creates the ultrasonic wave energy. It is also possible the wave energy is caused by a combination of the foregoing or some other factors.

Although the precise mechanism is not known, it is known that ultrasonic energy is produced in the region of the discharge gap 50 when an electrical current flows across the gap and that the generation of the energy is primarily a function of the rate of change of the current. This wave energy is radiated through the liquid 18 and towards the workpiece 12 whereby it is reflected from the entrant and rear surfaces 14 and 16 and any discontinuities therebetween. The returning echoes are received by transducer 22 whereby corresponding electrical signals are produced. Normally, the reflected energy is in the form of one or more echoes and the resultant electrical signal is similar to the waveform in FIG. 4C. This signal includes a first pulse 81 corresponding to the ultrasonic pulse transmitted by the transducer 20 and received directly by the transducer 22. This is followed by a pulse 83 corresponding to the echo from the front surface 14 and a pulse 85 corresponding to the echo from the rear surface 16. There may also be additional pulses 87 corresponding to the reverberations with the workpiece 12. If there are any internal discontinuities there will be pulses between pulses 83 and 85. The number of echoes are a function of the number of reflecting surfaces. The time between the pulses is a function of the range to the reflecting surface.

The electrical signals or pulses are coupled through the receiving means 24 to the vertical deflection means 42 in the oscilloscope 40. Each time the pulse switches the SCR 66 in the horizontal sweep generator 98 is triggered. The combination of the vertical deflection and horizontal scan is effective to produce an A-scan trace 100 similar to FIG. 4C. The gate 38 is triggered by the pulser 60 so as to be opened and closed in synchronism with the transmission. Normally the gate would open just before the pulse 83 and close just after pulse 85. The sweep generator would then be synchronized with the opening and closing of the gate 36 whereby the entire trace would correspond entirely to just one trip through the workpiece 12.

There are several very important differences between this trace 100 and the prior art traces. In the prior art transducers a physically vibrating member, such as a piezoelectric crystal has been employed to generate the ultrasonic energy. In a high quality transducer the crystal may be highly damped and have a "Q" of about 5. Such a crystal continues to vibrate on the order of 5 complete cycles after the driving signal stops. As a consequence the radiated ultrasonic energy has included a "packet" of waves with at least 5 complete cycles. In addition, due to the physical inertia of the crystal, etc., the maximum amplitude is normally not reached until about the second or third half cycle.

In the event there are two closely spaced targets (i.e. less than 1 or 2 wavelengths apart) such as a defect just below the entrant surface, the echo from the second target, i.e. the defect, commences before the termination of the echo from the first target, i.e. the surface. As a consequence it is virtually impossible for the operator to resolve the two closely spaced targets.

In contrast to the foregoing if the current flow across the gap 50 is properly controlled the ultrasonic energy may be made to consist of essentially one-half or 1 cycle. This results in the displayed pulses 83 and 85 being very narrow and of only a one-half or 1 cycle. Moreover, since the frequency may be made very high the wavelength of the pulse is correspondingly shortened. Thus even very closely spaced target can be resolved.

SUMMARY OF OPERATION

In order to employ this embodiment the workpiece 12 is immersed in the bath and the transmitting and receiving transducers 20 and 22 are focused on the workpiece. The pulser 60 is then energized whereby a series of timing pulses are coupled to the gate 78 in the SCR 66. Between the timing pulses the SCR 66 is nonconductive and the condenser 74 is charged. When the timing pulse occurs the SCR 66 becomes conductive and a current flows over the coaxial cable 54 and across the discharge gap 50. As previously stated, each time the current flows across the gap 50 a shock wave is created and ultrasonic energy is radiated. At least a portion of this energy is incident upon the workpiece 12 and is reflected from the various discontinuities, such as the front and back surfaces 14 and 16 and any defects therebetween.

Although the characteristics of the ultrasonic energy, such as the intensity, frequency, etc., are determined by a wide variety of factors it appears the energy is primarily a function of the rate of change of the current. If the flow of current rises to its peak at a high rate of change, the ultrasonic pulse will have a correspondingly high frequency. If the pulse is terminated within a relatively short interval, the resultant transmitted energy will be correspondingly short duration. By way of example, the electrical current within the discharge gap 50 may reach a maximum intensity in an interval on the order of less than one microsecond with the complete electrical pulse being terminated within a microsecond, or at most a few microseconds. The resultant ultrasonic pulse will include a high amplitude, undirectional wave with a rise time on the order of a small fraction of a microsecond and the wave will return to quiescence in a microsecond or so. The characteristics of the radiated energy is believed to be controlled primarily by the flow of an electric current and appears to be substantially independent of any physical movement of any massive structures, such as occurs with a crystal. As a result there will be no mechanical movement to dampen out and the pulse of ultrasonic energy can be essentially a very short unipolar wave form.

If it is desirable to place the transmitting transducer 20 in intimate contact with the workpiece 12, the passage through the shroud 94 may be filled with conductive fluid and the passage sealed by a cover, lens, membrane, etc. This may then be placed directly against the workpiece 12 or otherwise acoustically coupled thereto. The current is still discharged between the two electrodes 46 and 48 and across the gap 50.

As an alternative the embodiment of FIG. 5 may be used. This transducer 110 includes a housing 112 having a passage 114 extending axially therethrough. Several pairs 116, 118, 120 and 122 of electrodes extend across the passage 114 to form a corresponding number of discharge gaps. The electrodes in each pair are coupled to cables 124, 126, 128 and 130 which lead to a transmitter means 134 capable of generating a sequence of electrical pulses.

During operation of this transducer 110 the transmitter 134 produces a sequence of pulses over the cables 124 to 130 whereby the pairs 116 to 122 of electrodes are energized in a timed sequence. As the current flows across the gaps pulses of ultrasonic energy are generated as described above. Each of the current pulses from the transmitter 134 are timed to occur just as the ultrasonic wave front travels across the gap. The current pulse flows between the electrodes in the second pair 120 just as the wave front produced by the pair 124 arrives. The current pulses then circulate through the pairs 118 and 120 just as the wave fronts reach these pairs. It will thus be seen this array of electrodes can be used to increase the energy in the wave front and/or to focus the wave front.

While only a limited number of embodiments of the present invention have been disclosed herein, it will be readily apparent to persons skilled in the art numerous changes and modifications may be made thereto without departing from the spirit of the invention.

We claim:
1. In an ultrasonic nondestructive material tester for testing a workpiece a transmitting transducer including:
   a plurality of pairs of spaced electrodes forming a current path therebetween, each said pair of said plurality being aligned with one another and spaced a predetermined distance between one another;
   an electrically conductive fluid being disposed between the current paths of said pairs of electrodes;
   means coupled to said plurality of pairs of electrodes for sequentially applying a potential to said plurality of pairs of electrodes for causing a current to flow sequentially between each pair of such plurality; and means for limiting the current flow between said plurality of pairs of electrodes to a level below the arcing point thereof whereby each pair of said plurality of pairs of electrodes has current flow therebetween timed to occur as the ultrasonic wave flow travels across each current path.

2. A nondestructive tester for testing a workpiece, said tester including the combination of:
- a transducer having a pair of electrodes electrically separated from each other by spaced current path;
- an electrically conductive fluid between the electrodes of said pair filling said path, the fluid being sufficiently electrically conductive to allow current to flow between said pair of electrodes when the voltage across said pair of electrodes is less than a predetermined breakdown voltage level;
- pulse means coupled across the electrodes in said transducer for applying a voltage across said pair of electrodes which is below the breakdown voltage of said path, said pulse means being effective to produce an electrical current between the electrodes and through the electrically-conductive fluid, whereby ultrasonic energy is transmitted toward the workpiece;
- at least one additional pair of electrodes effective to form at least one additional spaced current path, the current paths being separated from each other by a predetermined distance; and
- said pulse means being effective to circulate pulses of current sequentially across said spaced current paths, whereby ultrasonic energy is produced in each path, said pulse means being effective to circulate said current pulses at intervals which are substantially coincident with the intervals required for the ultrasonic energy to travel said predetermined distances.

3. The nondestructive tester as defined in claim 2 and including receiving means effective to receive the ultrasonic energy from the workpiece.

4. The nondestructive tester as defined in claim 2, wherein the pulse means is effective to circulate a pulse of electric current across the pulsed current path which is substantially unipolar.

* * * * *